United States Patent [19]

Iwata

[11] Patent Number: 4,970,556

[45] Date of Patent: Nov. 13, 1990

[54] AUTO-ILLUMINATING CONTROLLER AND IMAGE FORMING APPARATUS USING THE SAME

[75] Inventor: Yasuhiro Iwata, Yokohama, Japan

[73] Assignee: Kabushiki Kaisha Toshiba, Kawasaki, Japan

[21] Appl. No.: 212,481

[22] Filed: Jun. 28, 1988

[30] Foreign Application Priority Data

Jun. 30, 1987 [JP] Japan ................................ 62-161040

[51] Int. Cl.[5] ...................... G03G 21/00; G03B 27/72

[52] U.S. Cl. ...................................... 355/214; 355/69; 355/228

[58] Field of Search ................... 355/68, 69, 208, 214, 355/218, 228

[56] References Cited

U.S. PATENT DOCUMENTS 3,998,547 12/1976 Schroter et al. ...................... 355/68
4,352,553 10/1982 Hirahara ......................... 355/208 X
4,354,758 10/1982 Futaki ............................ 355/68 X
4,465,358 8/1984 Miura ................................ 355/214
4,474,453 10/1984 Yanagawa et al. ............ 355/214 X
4,636,063 1/1987 Takai et al. .......................... 355/68
4,707,114 11/1987 Aoki ................................ 355/214 X
4,839,696 6/1989 Ohtani ............................ 355/214 X

FOREIGN PATENT DOCUMENTS 39-11538 6/1964 Japan .

*Primary Examiner*—Fred L. Braun
*Attorney, Agent, or Firm*—Foley & Lardner, Schwartz, Jeffery, Schwaab, Mack, Blumenthal & Evans

[57] ABSTRACT

An original scanning section has an illuminating source, and optically scans an original in the first direction to obtain a reflected light from the original. A designating section designates a desired range of the original as a designation area. Each of photosensors is arranged in the second direction perpendicular to the first direction so as to receive part of the reflected light and output a detection signal corresponding to a density of each portion of the original. A weighting operation section receives a designation output from the designating section, provides different weighting data for an inside area and an outside area of the designation area, receives each detection signal from the plurality of photosensors, operates each detection signal using the different weighting data, and outputs a density signal of the original. A control section receives the density signal from the weighting operation section and controls an illuminating amount of the illuminating source to be a correct value corresponding to the designation area and the density of each portion.

11 Claims, 14 Drawing Sheets

AUTO-ILLUMINATING CONTROLLER AND IMAGE FORMING APPARATUS USING THE SAME

BACKGROUND OF THE INVENTION

1. Field of the Invention

This invention relates to an image forming apparatus and an auto-illuminating controller thereof and, more particularly, to an apparatus for performing illumination amount control in accordance with the image density of an original, in an image scanner such as a laser printer or in a analog or digital copying machine having an image scanner and performing an electrophotogaphic process.

2. Description of the Related Art

In recent times, an apparatus for automatically controlling the illumination amount in illuminating scanning, in accordance with an original image, has been developed. The apparatus has been put into practice in, for example, a copying machine in which a scanner is moved reciprocally with respect to the fixed original, to scan the original. The light reflected by the original is guided onto a charged photosensitive body, through an optical system, to form, on the photosensitive body, an electrostatic latent image corresponding to the original image. The latent image is developed, and the developed image is transferred onto paper.

According to a known technique for illumination control, a light-receiving element is located in a path of the light reflected by an original. This element receives part of the light reflected by the original and converts it into an electrical signal. From this signal, the density of the image on the original is detected. From the detected image density it is determined how much light must be applied to the original, thereby to scan the original appropriately. If the light-receiving element is positioned near the original or a photosensitive body on which the reflected light is focused, it would be very difficult, if not impossible, for a single light-receiving element to detect the density of the original image across its entire width. Thus, in order to detect the density of the entire surface of the original, the element is fixed near an image-forming element located within an optical system, and outside the optical axis of the optical system.

However, even in the case of the above-described apparatus, uniform detection throughout the entire width of the original is not necessarily achieved. Rather, the sensitivity of the light-receiving element tends to be higher near a central portion of the original, in the widthwise direction, due to the position of the element. If a portion of the original has an extremely high density, the scanner is controlled to apply more light on this portion than on the other portions of the original. As a result, that portion of the copy which corresponds to this high-density portion of the original has a density lower than the density of the said original portion. The density of this copy portion may be so low that the data copied on this portion can hardly be legible.

The apparatus is disadvantageous in another aspect. When only a desired portion of the original is copied, the auto-illuminating sensor adjusts the amount of light to be applied to the desired portion is adjusted in accordance with the density of the sub-portion of the desired portion, which is denser than another other sub-portion. Consequently, those portions of the copied image which correspond to the lens dense sub-portions will have so low a density that they are almost illegible.

In view of this, it can be regarded as impossible to accomplish appropriate illuminating control by means of conventional techniques.

SUMMARY OF THE INVENTION

It is therefore an object of the present invention to provide a new and improved image forming apparatus which can perform optimum auto-illuminating control in accordance with the image density of a desired portion of an original.

According to one aspect of the present invention, there is provided an image forming apparatus comprising:

means for designating an image formation region of an original having an image density;

means for detecting the image density of the original within the image formation region designated by said designating means; and means for forming an image at the image density detected by said detecting means corresponding to the original within the image formation region.

BRIEF DESCRIPTION OF THE DRAWINGS

This and other objects and features of the present invention can be understood through the following embodiments, taken with reference to the accompanying drawings, in which:

FIGS. 1 to 18 show an embodiment of the present invention, in which

FIG. 1 is a schematic block diagram showing an arrangement of an illuminating control section;

FIG. 2 is a perspective view showing an outer appearance of a copying machine;

FIG. 3 is a view for explaining an arrangement of an optical system section;

FIGS. 4 and 5 are views illustrating a mounting position of a photosensor array;

FIGS. 6 and 7 are views illustrating another mounting position of the photosensor array;

FIG. 8 is a view for explaining an input range of light reflected by an original for each sensor;

FIG. 9 is a graph explaining a positional relationship between a designated illuminating area and each sensor;

FIG. 10 is a view showing the number of flags for each sensor;

FIGS. 11 to 14, and FIGS. 17 and 18 show the various number of flags for each sensor, and various illuminating areas designated under various conditions;

FIGS. 15 and 16 are views explaining how the signals are weighted with respect to the scanning direction.

FIG. 20 is a perspective view showing the outer appearance of a copying machine.

FIG. 21 is a side sectional view of the copying machine.

FIG. 22 is a block diagram showing the overall control circuit of the copying machine.

FIG. 23 is a perspective view schematically showing an arrangement of a carriage on which a spot light source and the like are mounted.

FIG. 24 is a view for explaining a designation operation of an erasure area.

FIG. 25 is a plan view showing an arrangement of an operation panel.

DETAILED DESCRIPTION OF THE PREFERRED EMBODIMENTS

Embodiments of the present invention will now be described below, with reference to the accompanying drawings.

Figure 2:
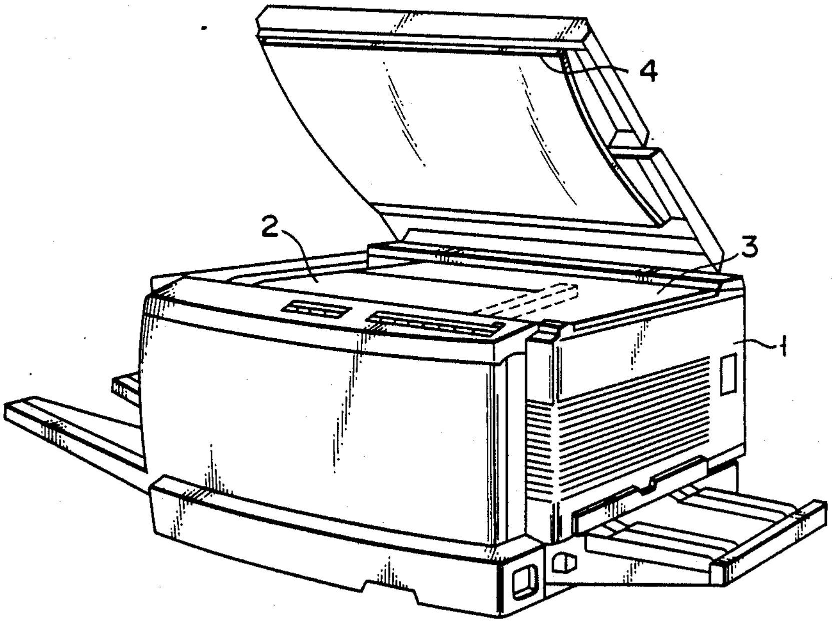

FIG. 2 shows an outer appearance of an analog copying machine of a type, wherein an original table is fixed and an illuminating scanning apparatus is moved, as an image forming apparatus to which an embodiment of the present invention is applied. More specifically, transparent original table 3, for supporting original 2, is arranged on the upper surface of copying machine 1. Original cover 4 is arranged on original table 3 to be freely opened and closed. A carriage (indicated by broken lines) of an illuminating scanning apparatus (scanner), which will be described later, for illuminating/-scanning original 2 supported by original table 3 is arranged on the lower surface of original table 3 to be reciprocally moved right-to-left.

Figure 3:
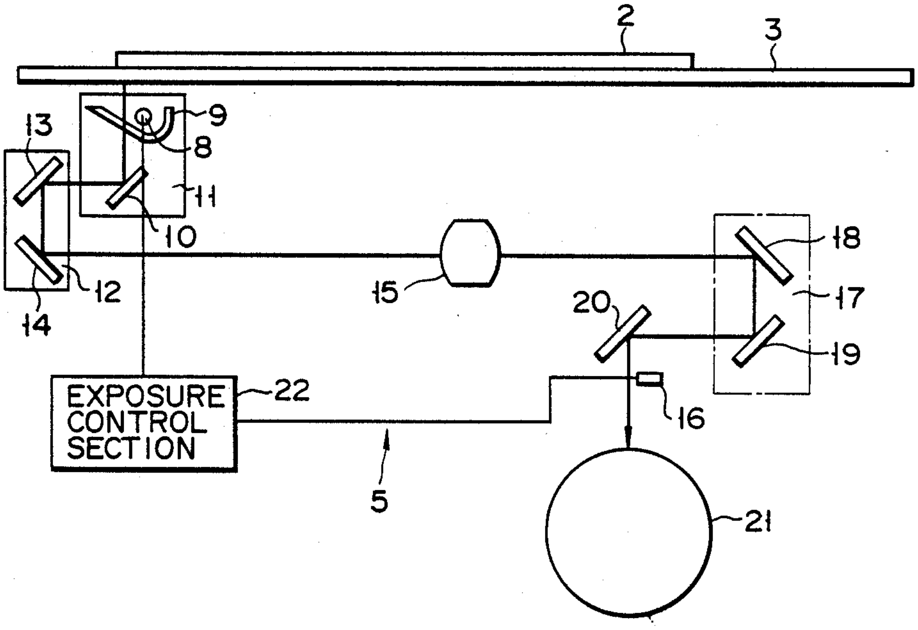

FIG. 3 shows an optical system section including illuminating scanning apparatus 5. More specifically, apparatus 5 comprises lamp 8 for illuminating original 2, reflector 9 serving as a reflecting mirror, for converging the light from lamp 8 onto the surface of the original, and first mirror 10 for receiving light reflected by original 2, and reflecting it in a predetermined direction. These three components are fixedly located on first carriage 11 The light emitted from lamp 8 and reflected by original 2 is reflected by first mirror 10, and then is reflected by second and third mirrors 13 and 14. Second and third mirrors 13 and 14 are fixed on second carriage 12, which is moved in the same direction as first carriage 11 but at half the speed thereof. The light becomes parallel to original 3 and is incident: on lens unit 15. The light emerged from lens unit 15 is reflected by fourth and fifth mirrors 18 and 19 of optical path adjusting-/correcting mirror unit 17. After the light is reflected by sixth mirror 20, it is partially incident on image density detecting photosensor array 16, and the remaining light (most of the light reflected from mirror 20) is focused on photosensitive body 21.

First and second carriages 11 and 12 of illuminating scanning apparatus 5 are both moved reciprocally on guide rails through sliding members, and are driven by, for example, a stepping motor. A driving force of the stepping motor is transferred through pulleys, timing belts, and the like, and contributes to a reciprocal movement of first and second carriages 11 and 12.

Figure 4:
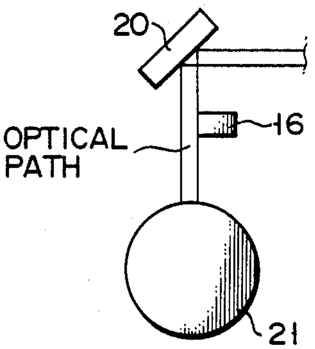
Figure 5:
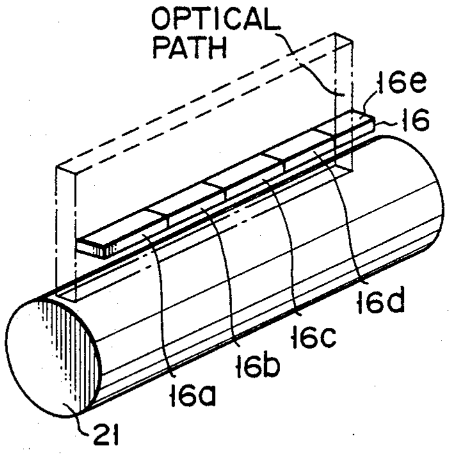

As is shown in FIGS. 4 and 5, photosensor array 16 is constituted by, e.g., an array of five sensors 16*a* to 16*e* which serve as light-receiving elements (charge coupled device; CCD).

In addition, photosensor array 16 may be arranged to receive light distributed by a mirror, an optical fiber or the like through part of the optical path.

Figure 6:
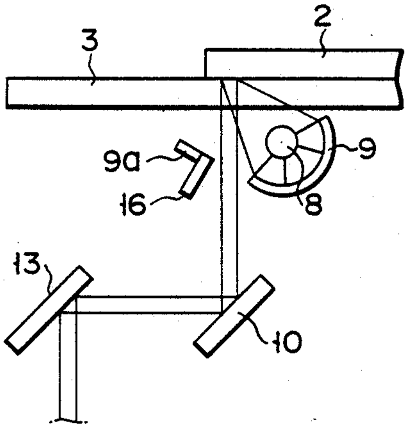
Figure 7:
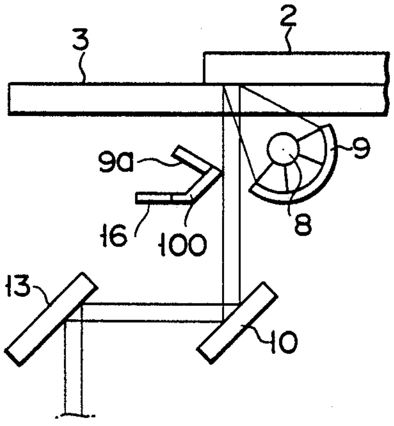
Figure 8:
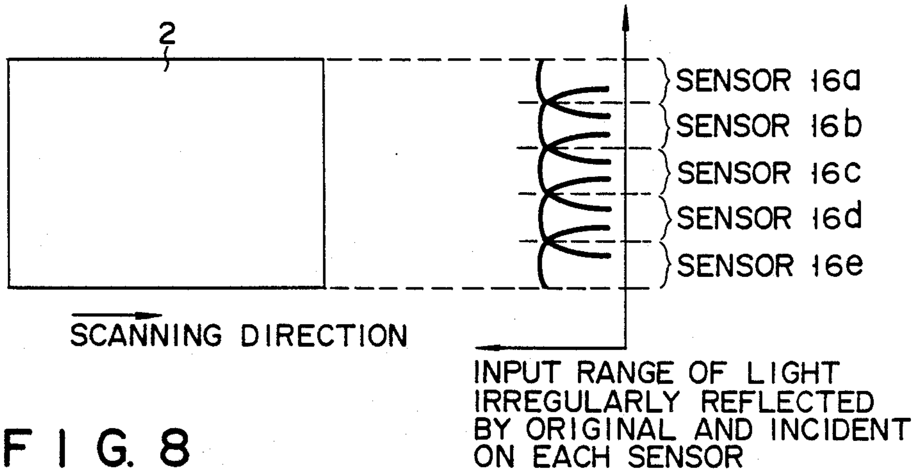

Furthermore, photosensor array 16 may be arranged near the original surface outside the optical path, as shown in FIG. 6, so as to receive light irregularly reflected by the original surface through reflector 9*a*. In this case, as shown in FIG. 7, in order to reduce the influence of heat generated by illuminating lamp 8, photosensor array 16 may be arranged to receive the irregularly reflected light through optical fiber 100 or the like. When it is arranged near the original surface or near an image forming surface of a drum, light irregularly reflected by the original surface to be received by each of sensors 16*a* to 16*e* is limited to a specific area, as shown in FIG. 8. Thus, the light received by each of sensors 16*a* and 16*e* is substantially limited to the density of a specific portion of the original.

When a photosensor is arranged to shield part of the optical path, a shielding end face of the array has a substantially linear form, and hence the light amount distribution of the optical path is not influenced.

The reflected light corresponding to the image density of original 2 incident on photosensor array 16 is converted into a light detection current by array 16. The output signal from array 16 is transmitted to illuminate control section (lamp regulator) 22. The light amount of illuminating lamp 8 is controlled by illuminating control section 22, thereby controlling the illuminating amount of illuminating scanning apparatus 5.

Figure 1:
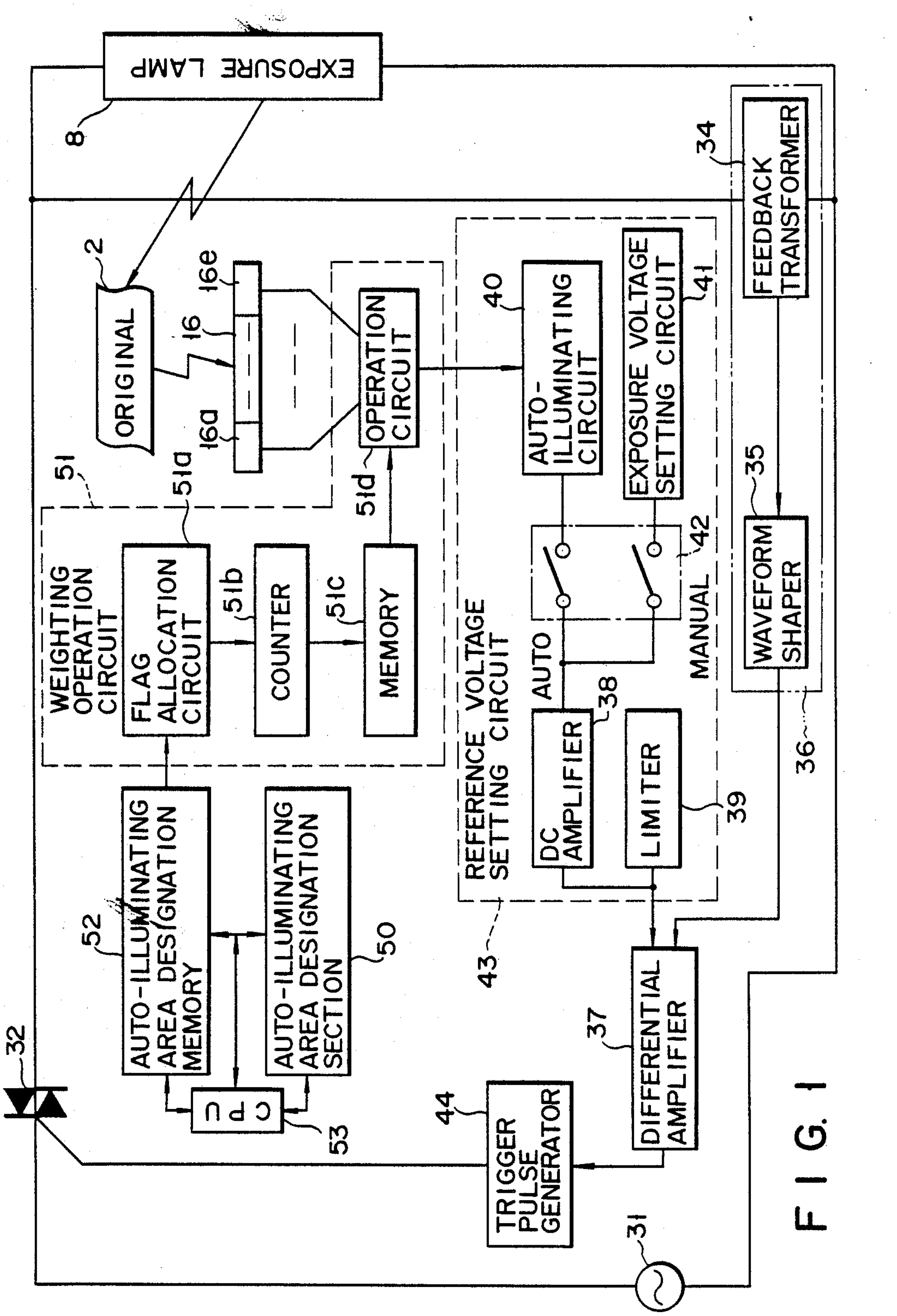

FIG. 1 schematically shows an example of illuminating control section 22. More specifically, illuminating lamp 8 is connected to commercial AC power source 31 through bidirectional thyristor (triac) 32. Feedback transformer 34 is connected to illuminating lamp 8. Feedback transformer 34 serves to output a voltage (feedback signal) corresponding to a voltage across the two ends of illuminating lamp 8 when thyristor 32 is turned on. The output voltage from feedback transformer 34 is supplied to waveform shaper 35. Waveform shaper 35 serves to convert the output from feedback transformer 34 into a voltage corresponding to the effective voltage of illuminating lamp 8 by waveform shaping. In this case, feedback transformer 34 and waveform shaper 35 constitute voltage generator 36 for generating a voltage corresponding to the voltage to be applied to illuminating lamp 8. The output voltage from waveform shaper 35 is supplied to a comparator, e.g., differential amplifier 37. Differential amplifier 37 also receives outputs from DC amplifier 38 and limiter 39. DC amplifier 38 receives an output corresponding to an operation result supplied from weighting operation circuit 51, which will be described later, i.e., an output from auto-illuminating circuit 40 corresponding to the density of original 2, or an output from manual illuminating voltage setting circuit 41 through switch 42. In this case, DC amplifier 38, limiter 39, auto-illuminating circuit 40, illuminating voltage setting circuit 41, and switch 42 constitute reference voltage setting circuit 43.

The output from differential amplifier 37 is supplied to trigger pulse generator 44, so that the timing of generating a trigger pulse is controlled. The conduction angle of thyristor 32 is controlled by an output from trigger pulse generator 44, and an output voltage from feedback transformer 34 is changed in the same manner. Therefore, even if the voltage of AC power source 31 is changed, the voltage applied to illuminating lamp 8 can be kept constant.

Outputs from the sensors 16*a* to 16*e* of photosensor array 16 are supplied to operation circuit 51*d* of weighting operation circuit 51. Weighting operation circuit 51 operates the output signals (density signals corresponding to the image densities of the respective portions of original 2) from sensors 16*a* and 16*e* by changing weighting coefficients of the respective output signals in accordance with area designation data from auto-illuminating area designation memory 52, and outputs a mean value or total value of these operation results to auto-illuminating circuit 40 as a density signal. In order to weight for each of sensors 16*a* and 16*e*, weighting operation circuit 51 processes the overall original image area as a lattice-like coordinate system to allocate flag "1" or "0" to each lattice element using flag allocation circuit 51*a*, counts the number of flags "1" in the designation area using counter 51*b*, stores in memory 51C these count values, i.e., the number of flags "1" in an area corresponding to each of sensors 16*a* to 16*e* as weighting (contribution rate) data of each of sensors 16*a* to 16*e*, and operates the detection signals from sensors 16*a* to 16*e* by the weighting data from memory 51*c* using operation circuit 51*d*.

Accordingly, the original density corresponding to the designation area is preferentially processed as a determination reference density for an auto illuminating operation.

Figure 9:
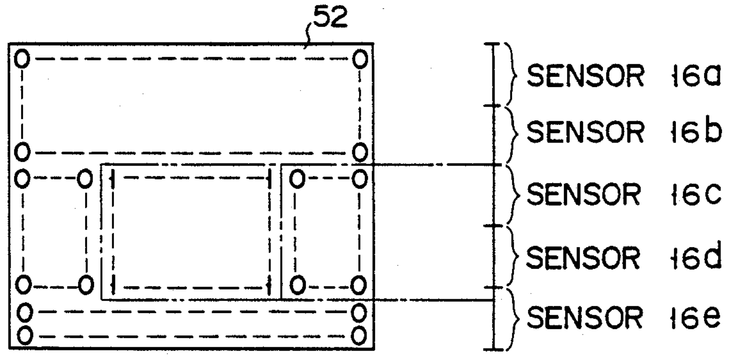
Figure 10:
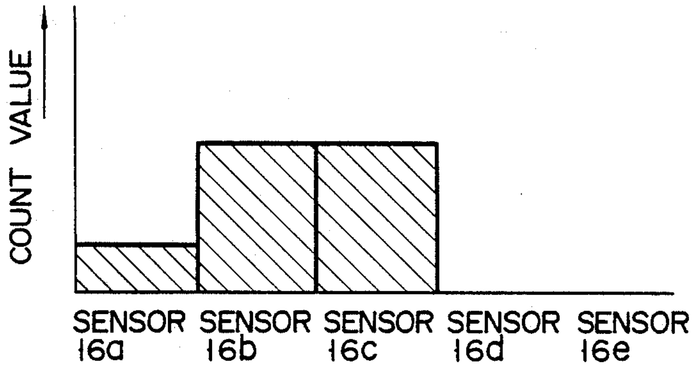

For example, when a designation area is present as shown in FIG. 9, the count distribution (the number of flags "1") for each of sensors 16*a* to 16*e* is obtained as shown in FIG. 10.

Auto-illuminating area designation memory 52 stores an original area (image density detection range) for density detection for performing auto-illuminating, i.e., data of a designation area to which auto-illuminating control is applied, through CPU 53.

Auto-illuminating area designation section 50 can easily perform a known method of designating an area by utilizing beam spot light from the lower surface of an original the same operational process and apparatus as in area designation method for partial copying, as shown in FIGS. 20 to 25. Instead of this method, another known method of area designation wherein X-Y coordinates are input on the original surface using a ten-key pad may be employed.

For example, as shown in FIG. 9, auto-illuminating area designation section 50 sets flags "1" within a designated range, and sets flags "0" outside the range. In this case, when photosensor array 16 is to directly receive light irregularly reflected by an original surface, or array 16 is arranged in the optical path in a one-to-one copy mode, sensors 16*a* to 16*e* of array 16 correspond to the areas, as shown in FIG. 9.

Figure 11:
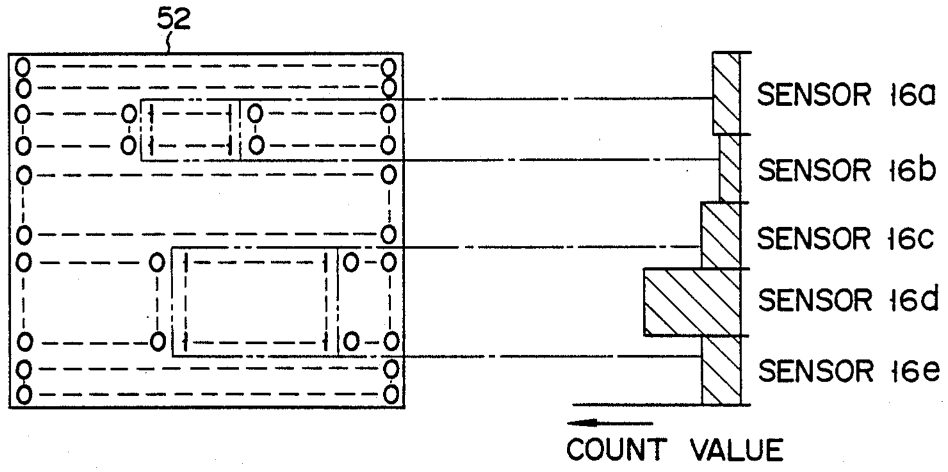

In addition, when a plurality of areas are designated, ranges designated in the same manner as described above are stored in auto-illuminating area designation memory 52, and a count value of each area corresponding to each of sensors 16*a* to 16*e* is calculated (refer to FIG. 11).

Figure 12:
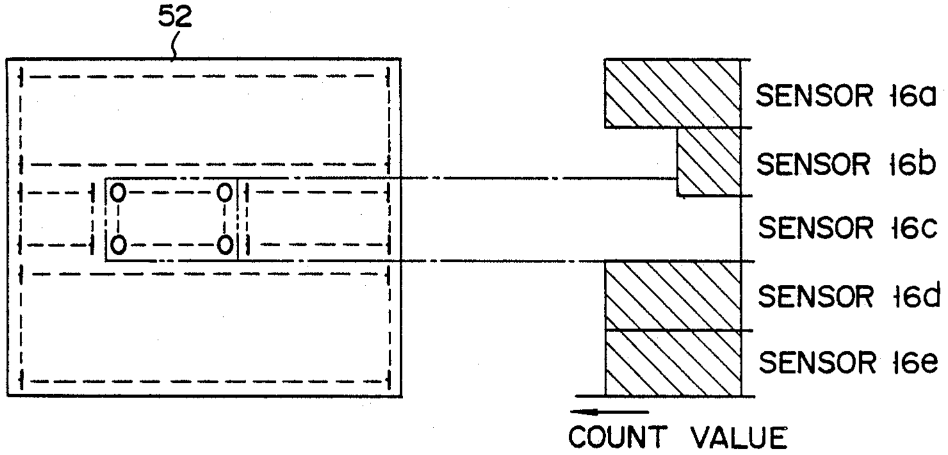

In area designation by means of auto-illuminating area designation section 50, when a specific area is to be set outside the auto-illuminating operation, flags "1" and "0" in FIG. 9 are reversely stored in auto-illuminating area designation memory 52, and a count value of each area corresponding to each of sensors 16*a* to 16*e* is calculated in weighting operation circuit 51 (refer to FIG. 12).

When photosensor array 16 is arranged in an optical path near photosensitive body 21, the width of a designation area on an original and the light-receiving width of each of sensors 16*a* to 16*e* are changed in enlargement and reduction modes. For this reason, the relationship between each of sensors 16*a* to 16*e* and an area designation range upon enlargement and reduction must be taken into consideration in the following manner.

Figure 13:
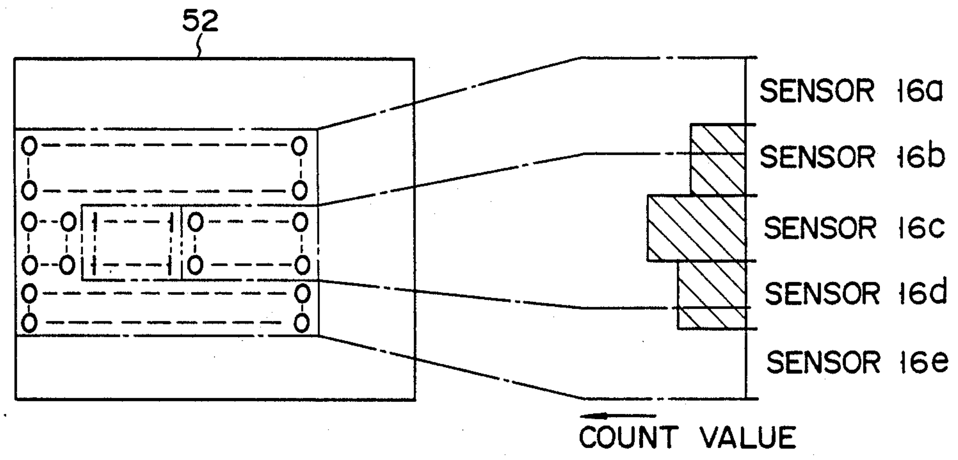
Figure 14:
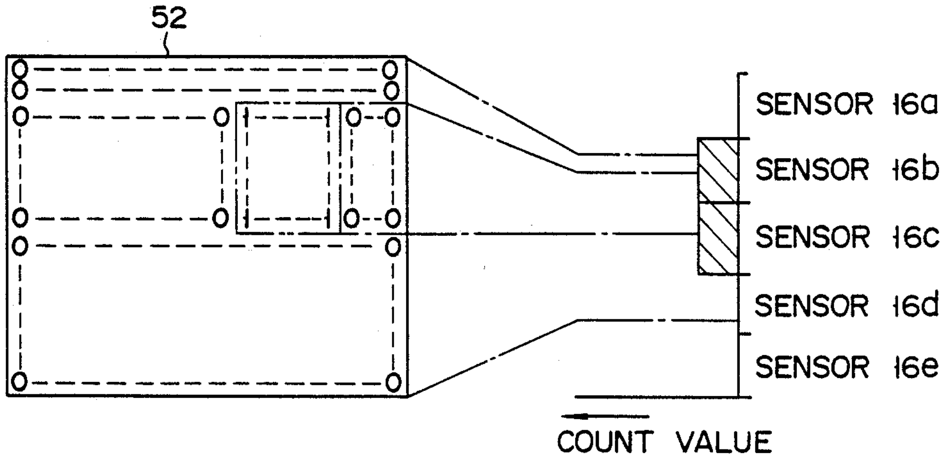

For example, in the enlargement mode, the relationship between each of sensors 16*a* to 16*e* of photosensor array 16 and an area designation range stored in auto-illuminating area designation memory 52 is established as shown in FIG. 13. Accordingly, weighting operation circuit 51 calculates a designation area width at a position of each of sensors 16*a* to 16*e* using enlargement ratio data at that time. Counting is performed in accordance with this calculation result. In the reduction mode, the relationship between each of sensors 16*a* to 16*e* and an area designation range is established, as shown in FIG. 14.

Figure 15:
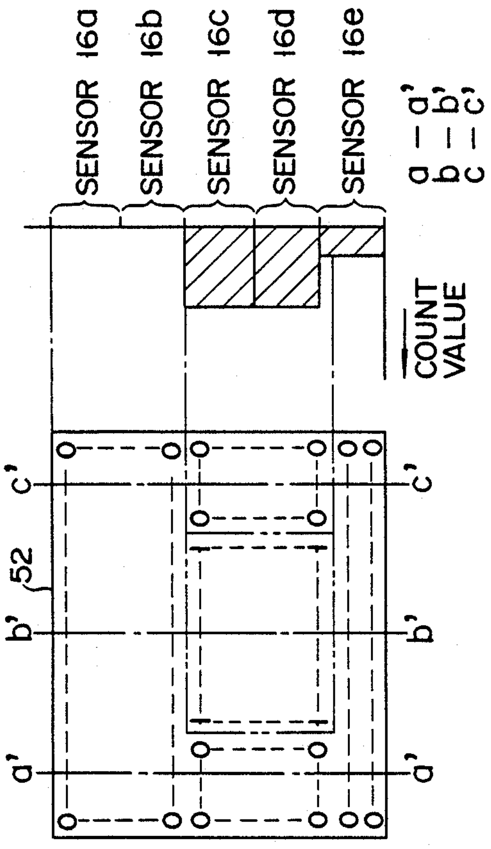

In weighting operation circuit 51, a weighting distribution in the scanning direction may not be changed, or weighting may be changed inside and outside an area designation range. More specifically, if original scanning is performed while weighting corresponding to an area designation result supplied from auto-illuminating area designation memory 52 is kept constant along the scanning direction (refer to FIG. 15), switching of weighting during scanning is not required, thereby simplifying the circuit arrangement.

Figure 16:
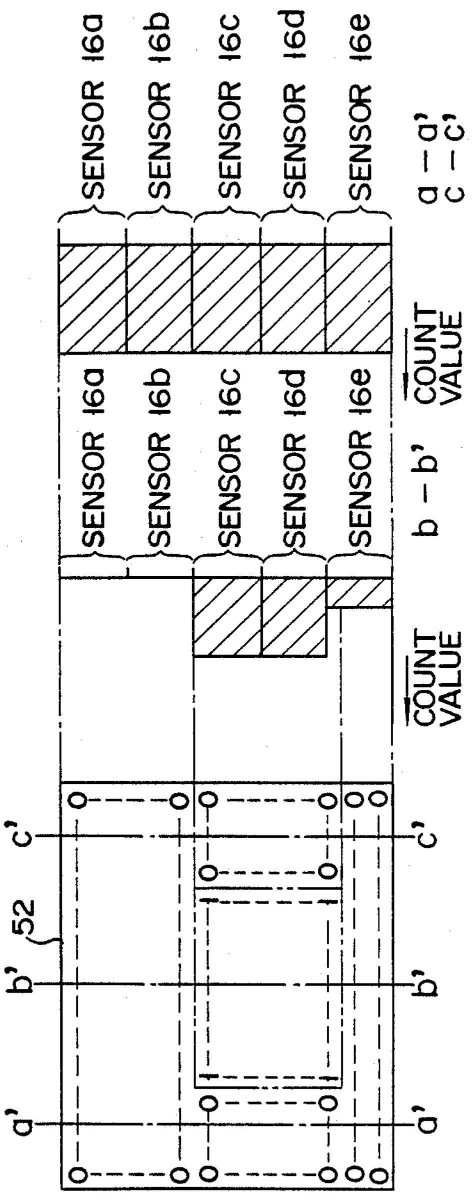

In addition, weighting corresponding to an area designation result supplied from auto-illuminating area designation memory 52 may be switched along the scanning direction (a—a', c—c', and b—b'), as shown in FIG. 16.

Figure 17:
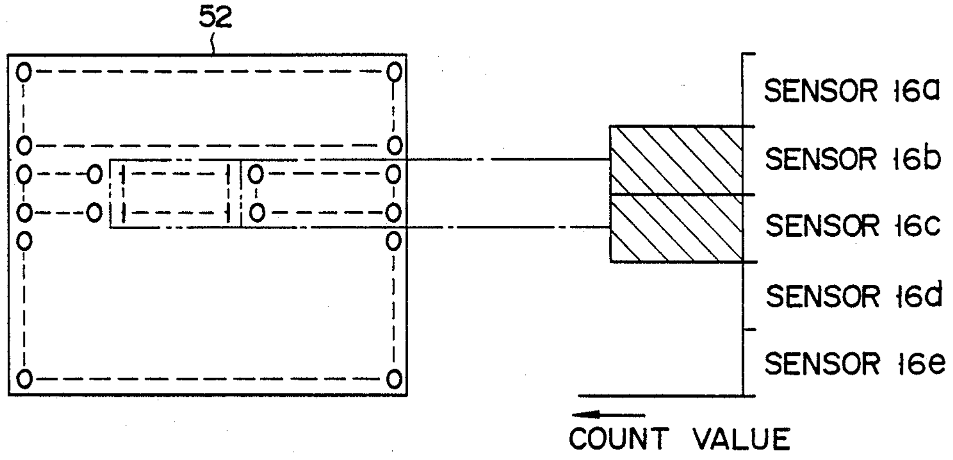
Figure 18:
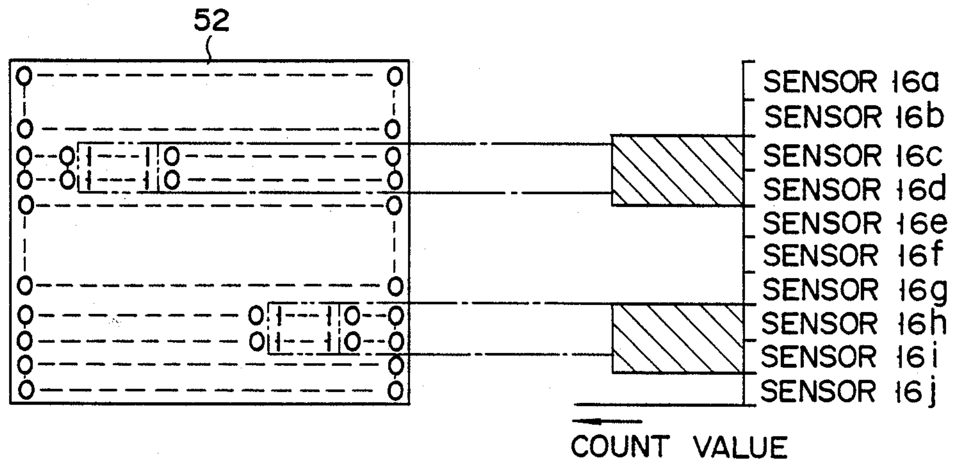

Although outputs from sensors 16*a* to 16*e* are weighted by various coefficients using weighting operation circuit 51, they may be weighted with 0% or 100%, i.e., expressed in the binary system. In this case, if an area corresponding to a predetermined one of sensors 16*a* to 16*e* overlaps a designation area, 100% weighting is performed. When it does not overlap the designation area, 0% weighting is performed (refer to FIG. 17). Accordingly, when intervals between sensors 16*a* to 16*e* are large and the division density is low, excellent approximation cannot be performed. However, when the division density is high and a large number of sensors (16*a* to 16*j*) are used, excellent approximation can be performed (refer to FIG. 18).

In the above-described case, a copying operation is performed by designating the image density detection range. However, the present invention is not limited to this, and a copying operation may be performed in the same manner as described above. More specifically, partial copying is performed in accordance with a partial copy designation area while the designation area is processed as an image density detection range.

In this case, partial copying can be performed without being influenced by the density of an image outside the partial copy designation area, and hence a non-clear portion can be eliminated.

The operation in the above-described arrangement will be described below. An operator sets an auto-illuminating mode using switch 42, and designates an image density detection range using auto-illuminating area designation section 50. Then, the image density detection range is stored in auto-illuminating area designation memory 52 through CPU 53. With this operation, the number of flags "1" corresponding to each of sensors 16*a* to 16*e* is counted in weighting operation circuit 51, and the number (total value) of flags "1" for each of sensors 16*a* to 16*e* is stored in a memory section in weighting operation circuit 51 as weighting data.

In such a state, illuminating lamp 8 is turned on, and original 2 is illuminated/scanned. Light reflected by original 2 upon illuminating/scanning is guided onto photosensitive body 21 through first, second, and third mirrors 10, 13, and 14, lens unit 15, and fourth, fifth, and sixth mirrors 18, 19, and 20, while it is partially guided to array 16. Then, outputs, i.e., density signals from sensors 16*a* to 16*e* of array 16 are supplied to weighting operation circuit 51. In this case, density signals corresponding to changes in image density of one-line portion of original 2 are outputted by utilizing the outputs from sensors 16a to 16e.

Subsequently, weighting operation circuit 51 operates the density detection signals from sensors 16a to 16e with corresponding weighting data stored in the memory section, thereby outputting, as a mean or total value, the operation results to auto-illuminating circuit 40 as a density signal. With this operation, auto-illuminating circuit 40, i.e., reference voltage generator 43 generates a reference voltage in accordance with the supplied density signal. This reference voltage and an output voltage from feedback transformer 34 are compared by differential amplifier 37, and a voltage corresponding to the difference between the two voltages is supplied to trigger pulse generator 44. Trigger pulse generator 44 generates a trigger pulse synchronized with the frequency of power source 31 in accordance with the output voltage supplied from differential amplifier 37. The conduction angle of thyristor 32 is controlled by the trigger pulse, and the effective value of a voltage to be applied across the two ends of illuminating lamp 8. With this operation, the illuminating amount of illuminating lamp 8 is controlled in accordance with the designation area and the image density of original 2. As a result, a proper illuminating amount corresponding to an image within the density detection area of original 2 can be obtained.

While the illuminating amount is controlled in the above-described manner, an original image is formed by light guided onto photosensitive body 21, and an electrostatic latent image corresponding to the image of original 2 is formed on photosensitive body 21. This electrostatic latent image is developed by a developing unit (not shown) to be formed into a toner image. Then, this toner image is transferred onto paper (not shown), and is fixed by a fixing unit (not shown).

As has been described above, a plurality of sensors for detecting density of an original surface, each sensor independently detects the density of part of the original, a predetermined range of the original is designated, different weighting coefficients are assigned to sensors corresponding to the predetermined range and other sensors, a density signal is calculated with a corresponding weighting coefficient for each sensor, and the illuminating amount is controlled in accordance with the operation results, thereby performing proper illuminating control for the designated predetermined range.

Figure 19:
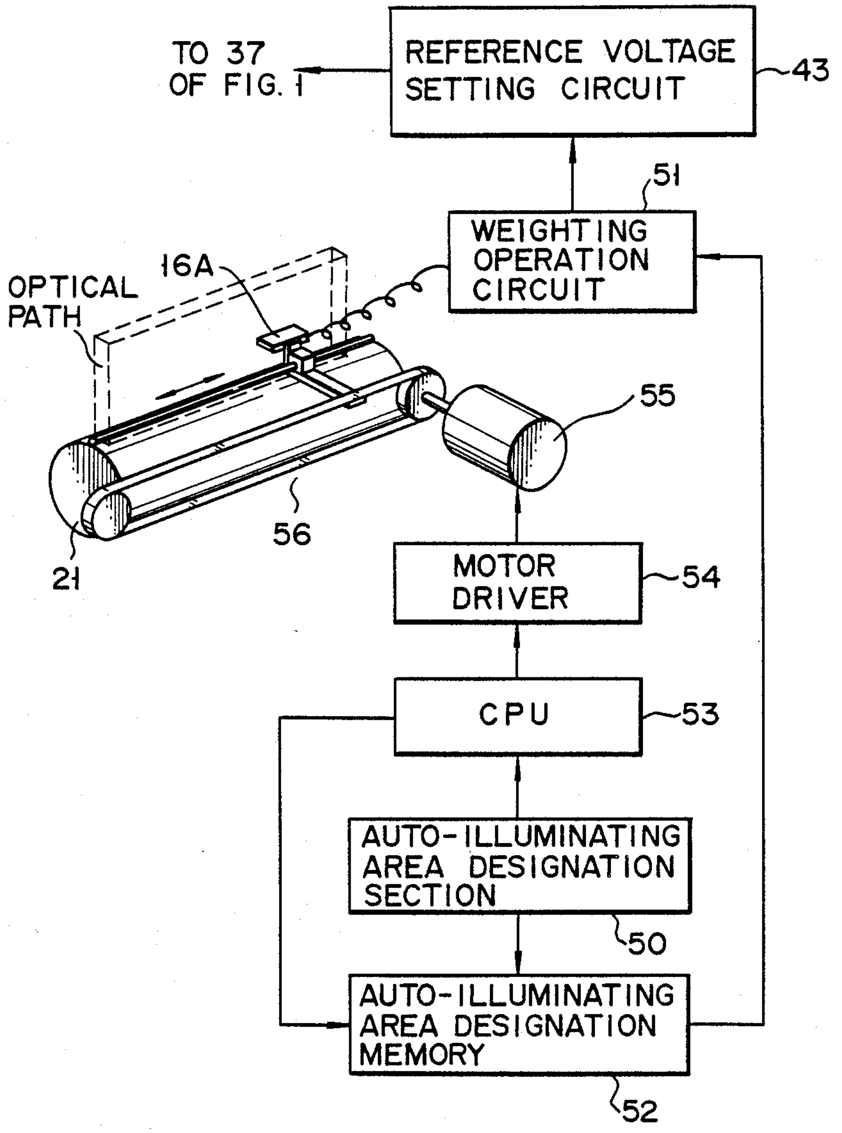
FIG. 19 is a view illustrating another embodiment of the present invention.

FIG. 19 shows a main part of another embodiment. According to this embodiment, in place of photosensor array 16 having five sensors 16a to 16e in the above-described embodiment, single photosensor 16A supported to be freely moved by driving mechanism 56 along photosensitive body 21 in a direction indicated by the arrow is used. A driving force is provided by motor 55 to driving mechanism 56. A positional signal corresponding to an area designation from auto-illuminating area designation section 50 equivalent to the one described above is supplied to motor 55 through CPU 53 and motor driver 54. With this operation, photosensor 16A is moved to a position corresponding to the designation area at a predetermined speed in the initial illuminating period of illuminating lamp 8 so that even a single photosensor can detect the density along the entire width of the original. This is a characteristic feature of the embodiment. Other arrangements and operations are substantially the same as those of the first embodiment except that a single sensor is used.

As has been described in detail, according to the present invention, there is provided an auto-illuminating controller which can perform proper illuminating control.

Still another embodiment of the present invention will be described with reference to the accompanying drawings of FIGS. 20 to 25.

Figure 20:
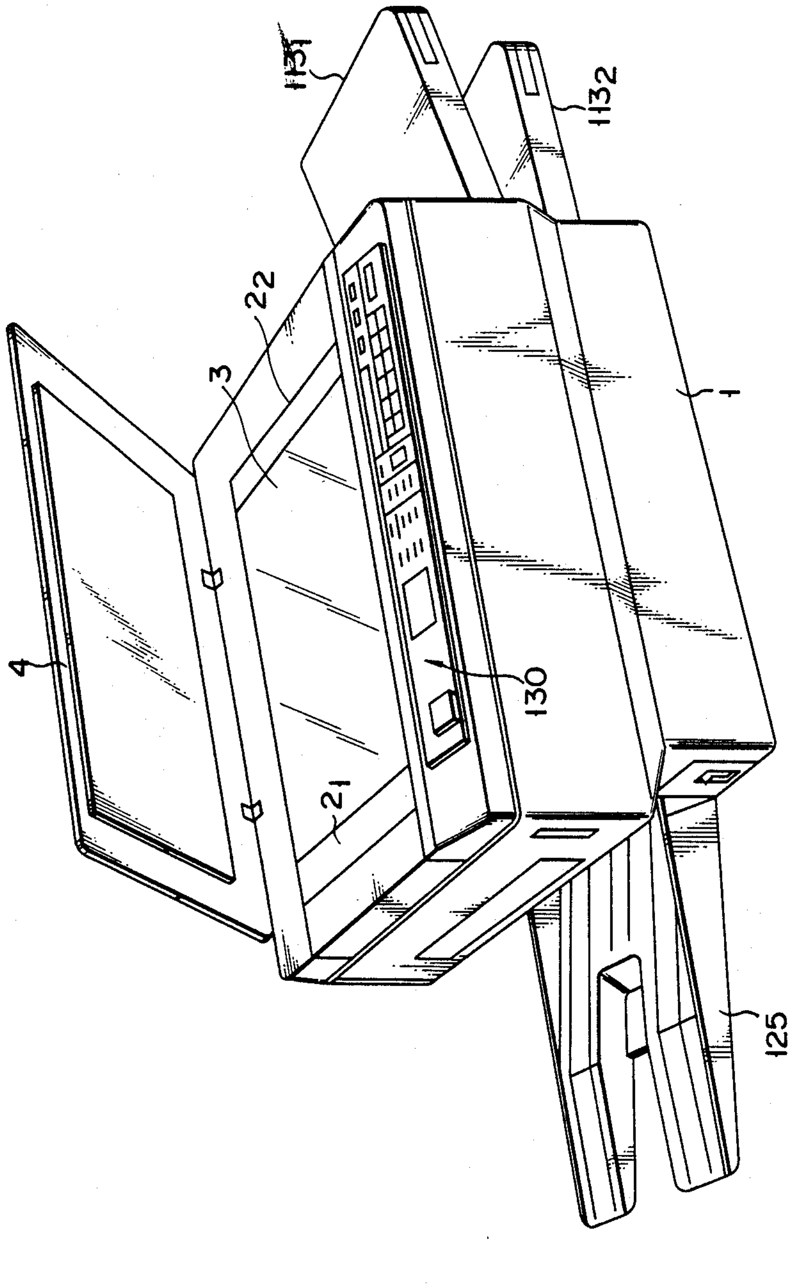
FIGS. 20 to 25 show still another embodiment of the present invention.
Figure 21:
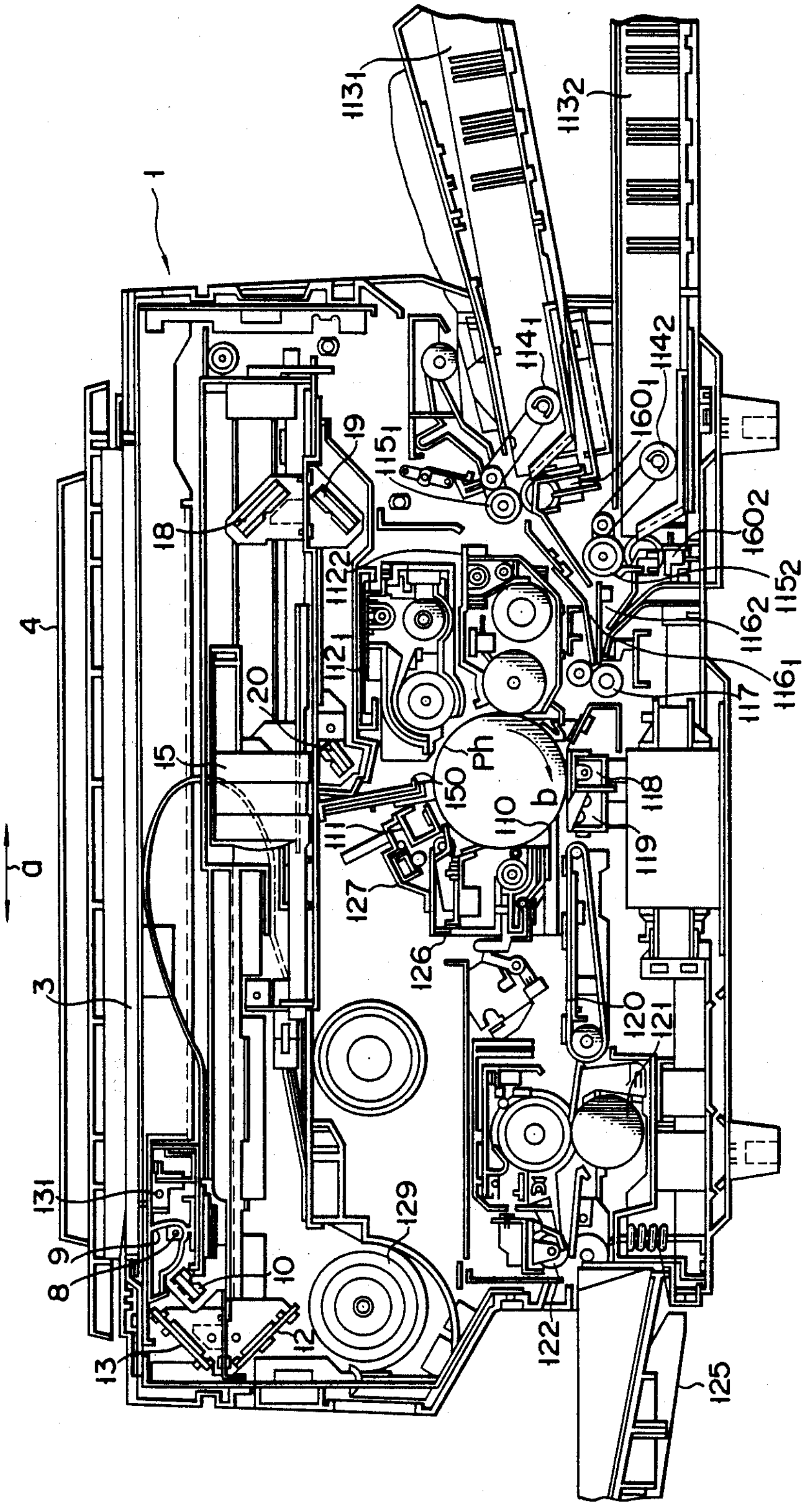

FIGS. 20 and 21 schematically show an image forming apparatus of the embodiment, e.g., a copying machine. More specifically, reference numeral 1 denotes a copying machine main body. Original table (transparent glass) 3 for supporting an original is fixed on the upper surface of main body 1. Stationary scales $2_1$ and $2_2$ are disposed at two end portions of original table 2. Openable/closable original cover 4 is mounted near original table 3.

An original placed on original table 3 is exposed and scanned when an optical system constituted by exposure lamp 8 and mirrors 10, 13, and 14 reciprocally moves in the direction of double-headed arrow a along the lower surface of original table 3. In this case, mirrors 13 and 14 are moved at a speed half that of mirror 10 so as to maintain a given optical path length. Light reflected from an original upon scanning by the optical system, i.e., light emitted from exposure lamp 8 and reflected by the original, is reflected by mirrors 10, 13, and 14, and then passes through variable magnification lens block 15. Thereafter, the light is reflected by mirrors 18, 19, and 20 and is guided to photosensitive drum 110. Thus, the image of the original is formed on the surface of drum 110.

Drum 110 is rotated in the direction of arrow b, and its surface is charged by charger 111. Thereafter, an image is slit-exposed on the charged surface of drum 110, thereby forming an electrostatic latent image thereon. The latent image is developed to be visible by toner supplied from developers $112_1$ and $112_2$ which store a red or black toner, and are selectively operated as needed. Developers $112_1$ and $112_2$ are detachably arranged on main body 1. The toner color stored in developer $112_1$ or $112_2$ can be determined such that a color code as a combination of projections (not shown) formed on the side surface of developer $112_1$ or $112_2$ is detected by a color detection switch including a plurality of microswitches.

Paper sheets as recording material are picked up one by one from either selected upper or lower paper feed cassette $113_1$ or $113_2$ by either pickup roller $114_1$ or $114_2$ and roller pair $115_1$ or $115_2$. Each of the paper sheets is guided to register roller pair 117 through either paper guide path $116_1$ or $116_2$, and is fed to a transfer section by register roller pair 117. Paper feed cassettes $113_1$ and $113_2$ are detachably arranged on the right lower end portion of main body 1 and can be operated by selecting one of those at an operation panel (to be described later). Note that a paper size for cassettes 131 and 132 is detected in accordance with their cassette size by cassette size detection switches $160_1$ and $160_2$ respectively. Each of cassette size detection switches $160_1$ and $160_2$ comprises a plurality of microswitches which are selectively turned on/off upon insertion of different size cassettes.

The paper sheet fed to the transfer section is brought into tight contact with the surface of drum 110 at a portion of transfer charger 118, so that a toner image on drum 110 is transferred to the sheet upon operation of charger 118. The sheet onto which the toner image was transferred is electrostatically peeled away from drum 110 by peeling charger 119, and is conveyed along conveyor belt 120 to fixing pair roller 121. The sheet is then fed into fixing roller pair 121 serving as a fixing device arranged at the trailing end portion of belt 120. The sheet having the fixed image thereon is then exhausted on tray 125 outside main body 1 by exhaust roller pair 122.

The residual toner on the surface of drum 110 which was subjected to the transfer operation is removed by cleaner 126, and an after-image on the surface of drum 110 is erased by discharging lamp 127, thus returning drum 110 to its initial state. Note that reference numeral 129 denotes a cooling fan for preventing the temperature in main body 1 from increasing.

Figure 23:
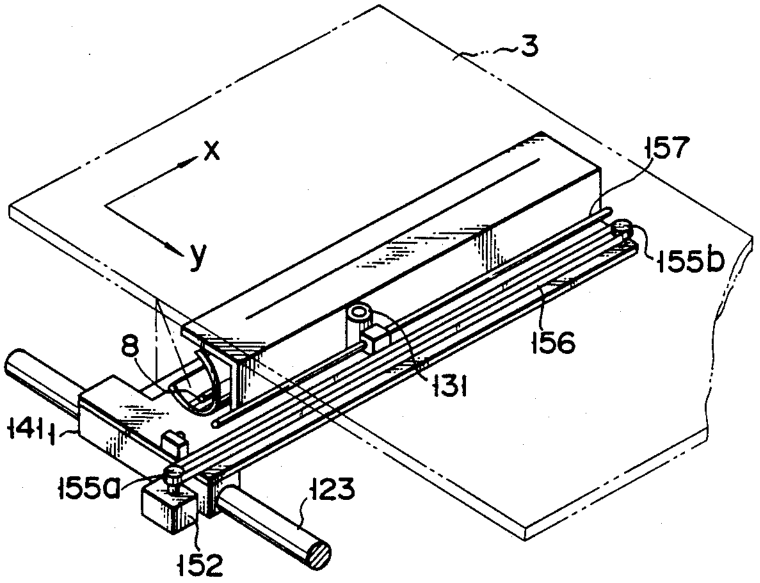
Figure 24:
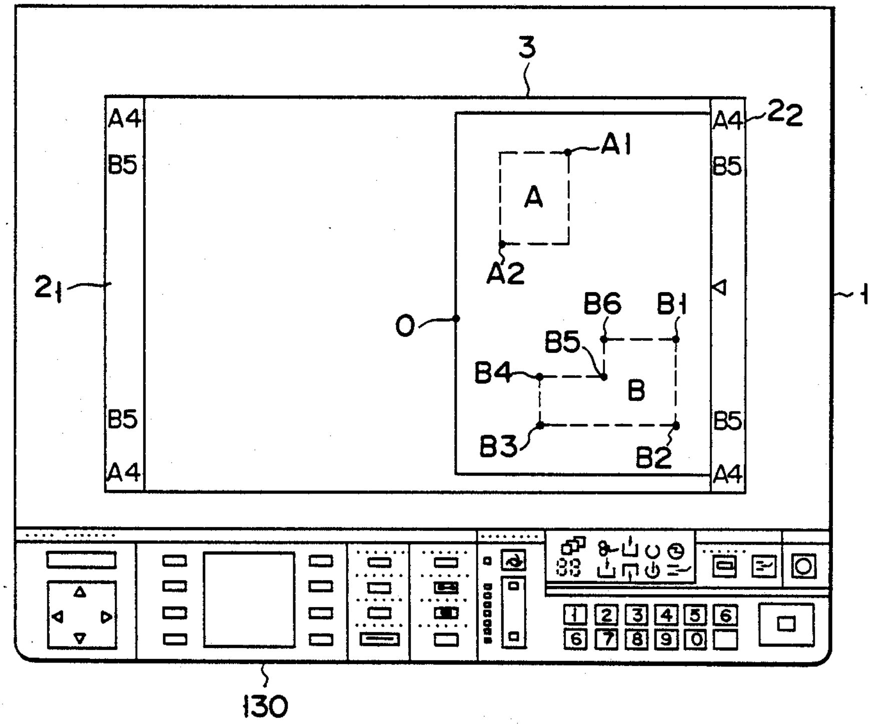

Spot light source 131 is movably mounted on carriage $141_{1'}$ on which exposure lamp 8, and the like are disposed. Spot light source 131 is movable in a direction (direction of arrow x in FIG. 23) perpendicular to the moving direction (direction of arrow y in FIG. 23) of carriage $141_1$ as shown in FIG. 23. Spot light source 131 comprises a light-emitting element for radiating a light spot on original table 3. In this case, carriage $141_1$ is movable in the direction of arrow y along shaft 123 by a drive mechanism (not shown), and spot light source 131 is movable in a direction of arrow x in FIG. 23 along shaft 157 by belt 156 looped between pulleys **155*a* and 155*b*. Pulley 155*a* is driven by motor 152. With this arrangement, as shown in FIG. 24**, given portion A, as an erasure area (image nonformation region), on original O can be arbitrarily designated by designating two points $A_1$ and $A_2$ or six points $B_1$, $B_2$, $B_3$, $B_4$, $B_5$, and $B_6$.

As shown in FIG. 21, erasure array 150 in which a plurality of light-emitting elements are arrayed is mounted between charger 111 and an exposure section of drum 110. When an original image is to be partially erased, the light-emitting elements constituting erasure array 150 are turned on in correspondence with an erasure area designated by, e.g., spot light source 131, thereby partially discharging drum 110. When the discharged portion is exposed by the exposure section, no latent image is formed thereon. As a result, the original image can be partially erased.

Figure 25:
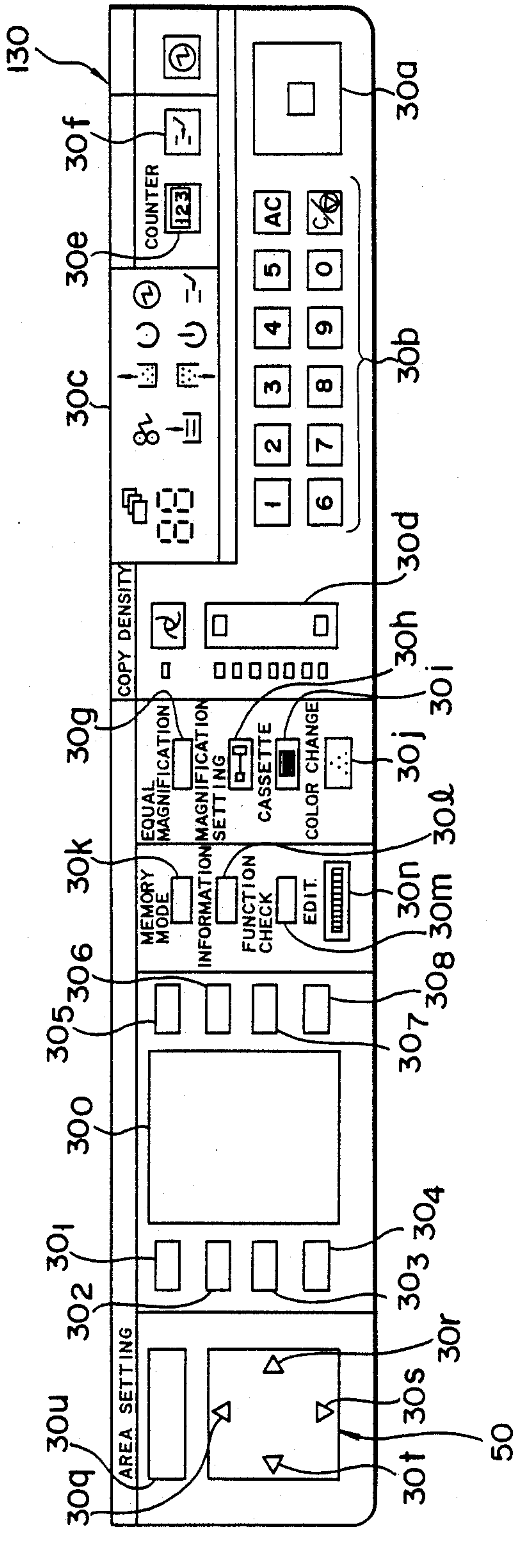

FIG. 25 shows operation panel 130 mounted on main body 1. Reference numeral **30*a* denotes a copying key for instructing start of a copying operation; 30*b*, ten keys for setting a copy count and the like; 30*c*, a display section for displaying operating states of respective sections, paper jam, and the like; 30*d*, a density setting section for setting a copying density; 30*e*, a count instruction key for instructing display of a total copy count and a copy count for each color; 30*f*, an interrupt key operated when a third party wants to copy during a copying operation; 30*g*, an equal-magnification key operated when a copying magnification is set at an equal magnification (100%); 30*h*, a magnification key operated when a copying magnification is set; 30*i*, a cassette selection key operated when upper or lower cassette $13_1$ or $13_2$ is selected; and 30*j***, a color change key operated when the color of toner is changed to perform a copying operation.

Reference numeral **30*k* denotes a mode memory key. For example, when edit key 30*n* is operated to designate an erasure area of original O, mode memory key 30*k* is operated so as to store the designated erasure area in a storage device (to be described later) or to read out, from the storage device, information such as an erasure area (nonformation region pattern for an original image) stored in the storage device. Reference numeral 30*l* denotes an information key operated when information corresponding to each mode is to be obtained. For example, when paper jam occurs and key 30*l* is operated, information for a paper jam state is displayed on display 30*o*. Reference numeral 30*m* denotes a function check key. When key 30*m* is operated, a currently set function can displayed on display 30*o*. Reference numeral 30*p* denotes a move key for moving spot light source 131. Move key 30*p* can be inclined in four directions as indicated by arrows 30*q* to 30*t*. When one of arrows 30*q* to 30*t* is operated, spot light source 131 is moved in the direction of the operated arrow. Reference numeral 30*u* denotes a position designation key. When key 30*u* is operated, a coordinate position indicated by spot light source 131** is stored in a memory (to be described later).

Edit key **30*n*** is operated when a partial erasure operation for copying an original image while erasing its given portion or a multicolor copying operation for copying an original image while changing the color of a designated portion is performed.

Display **30*o* comprises, e.g., a liquid-crystal dot matrix panel. Display 30*o* performs a corresponding display when edit key 30*n* or the like is operated. Operation keys $30_1$ to $30_4$ and $30_5$ to $30_8$ for selecting various functions displayed on display 30*o* are arranged at two side portions of display 30*o***.

Figure 22:
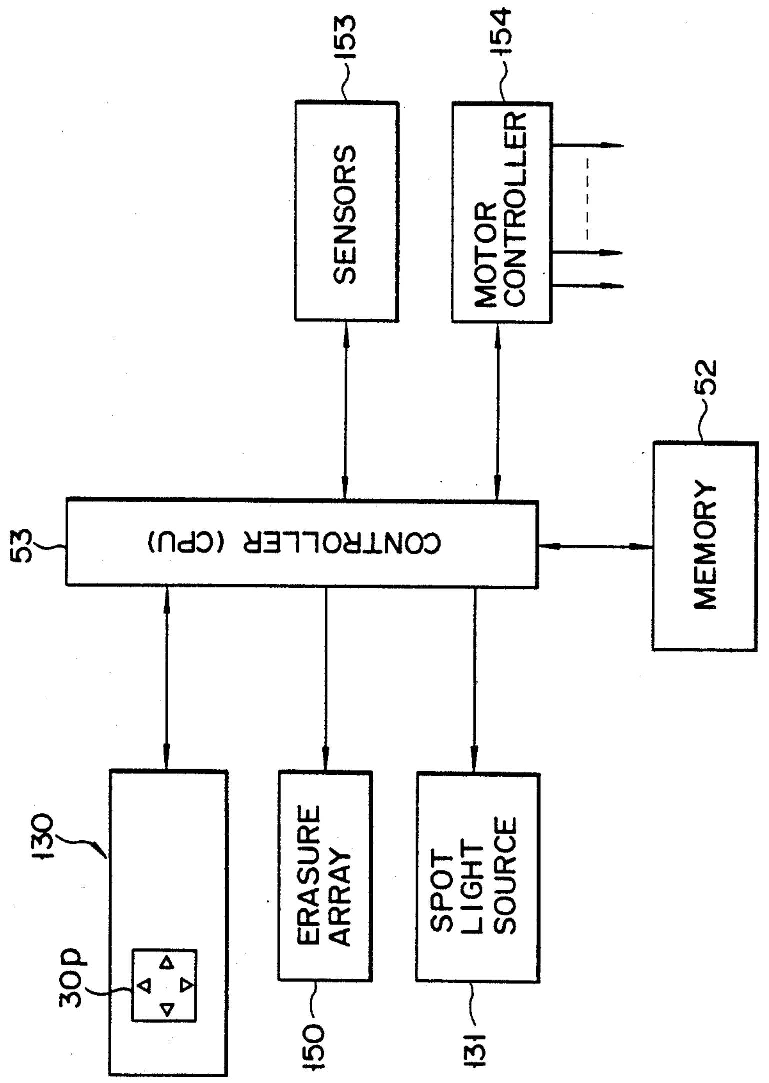

FIG. 22 shows the overall control circuit. Controller (CPU) 53 detects inputs from operation panel 30, and various sensors 153 such as color detection switches for detecting colors of toner stored in developers $112_1$ and $112_2$, cassette size detection switches $160_1$ and $160_{2'}$ and the like, and controls the chargers (not shown), discharging lamp 127, cleaner 126, fixing roller pair 121, exposure lamp 8, and motor controller 154 connected to various motors (not shown) to perform the above-mentioned copying operation. Controller 53 also controls spot light source 131, memory 52, erasure array 150, and the like to perform a partial copying operation for copying an original image while erasing an unnecessary portion of the original, a multicolor copying operation for copying an original while changing a color of a designated portion, and the like.

Memory 52 comprises a RAM (Random Access Memory), or the like. For example, when position designation key **30*u* is operated in the erasure area designation mode, memory 52 stores coordinate positions (image erasure area) indicated by spot light source 131**.

An operation for designating an erasure area of an original image will be described below. Assume that edit key **30*n* on operation panel 130 is operated. The area designation mode for designating an erasure area is then set and the data are displayed on display 30*o* of operation panel 30**. In this state, when clear key (operation key $30_5$) is operated, unnecessary data left in memory can be cleared.

After the clear operation, or when memory 52 need not be cleared, a two-point designation key (operation key $30_6$) or six-point designation key (operation key $30_7$) is selectively operated to select a function of a desired area on original O. When move key **30*p* on operation panel 30 is operated in accordance with the selected function, spot light source 131 is moved along desired portion A or B of original O, as shown in FIG. 24. When position designation key 30*u* is operated at an arbitrary position, the corresponding coordinate position is stored in memory 52**, thus completing designation of the erasure area of an image.

When designation of a required number of erasure areas of original O is completed, the designated erasure areas, i.e., the positions, the numbers, sizes, shapes, and the like of the designated erasure areas are confirmed in accordance with an operation of monitor key operation key $30_2$ or trace key operation key $30_3$. In this case, if the trace function is selected, spot light source 131 is moved along frames of designated erasure areas in the ON state, thus allowing confirmation of the positions, numbers, sizes, shapes, and the like of the areas. When the monitor function is selected, the designated erasure areas are displayed on display 30, so that their positions, number, sizes, shapes, and the like can be confirmed.

What is claimed is:

1. An image forming apparatus comprising:

means for designating a desired portion of an original;

means for detecting an image density of the original so as to output signals representing the densities of the portions of the original;

weighting operation means for providing different weighting data items for an area inside the desired portion and an area outside the desired portion, in accordance with a designation output from the designating means, so as to apply the different weighting data items to the signals outputted from said detecting means;

means for outputting a density signal representing the density of the original in accordance with the signals provided with the different weighting data items by said weighting operation means; and means for forming an image at the image density in accordance with the density signal outputted by said outputting means.

2. An image forming apparatus comprising:

scanning means for applying light to an original;

means for designating a desired portion of the original;

means for receiving light reflected from the original so as to output signals representing the densities of the portions of the original;

weighting operation means for providing different weighting data items for an area inside the desired portion and an area outside the desired portion, in accordance with a designation output from the designating means, so as to apply the different weighting data items to the signals outputted from said receiving means;

means for outputting a density signal representing the density of the original in accordance with the signals provided with the different weighting data items by said weighting operation means; and means for controlling an illumination amount of said scanning means to a value appropriately corresponding to the density of the desired portion of the original in accordance with the density signal from said outputting means.

3. An auto-illuminating controller for an image scanning apparatus, said controller comprising:

original scanning means having an illuminating source, for applying light to an original, thereby scanning the original in a first direction;

designating means for designating a desired portion of the original;

a plurality of photosensor means arranged in a second direction, perpendicular to the first direction, so as to receive light reflected from the original, and to output signals representing the densities of the portions of the original;

weighting operation means for receiving a designation output from the designating means and providing different weighting data items for an area inside the desired portion and an area outside the desired portion, and for receiving the signals output from said photosensor means, applying the different weighting data items to the signals, and outputting a density signal representing the density of the original; and control means for receiving the density signal from said weighting operation means and controlling an illumination amount of said illumination source into a value appropriate corresponding to the density of the desired portion of the original.

4. A controller according to claim 3, wherein said plurality of photosensor means are linearly arranged along an optical path of the light reflected from the original.

5. A controller according to claim 3, wherein said plurality of photosensor means are arranged near a mounting surface of the original outside the optical path of the light reflected from the original.

6. A controller according to claim 5, wherein said photosensor means are arranged through an optical fiber so as to prevent the influence of heat from said illuminating source.

7. A controller according to claim 3, wherein said photosensor means include a charge coupled device.

8. A controller according to claim 5, wherein said control means includes a bidirectional thyristor, one end of which is connected to an AC voltage source and the other end of which is connected to sad illuminating source, and trigger pulse generating means for controlling a conduction angle of said bidirectional thyristor on the basis of a density signal from said weighting operation means and a feedback signal from said illuminating source.

9. A controller according to claim 3, wherein said weighting operation means includes means for assigning a flag "1" to each unit lattice element inside the designation area and a flag "0" to each unit lattice element outside the designation area, means for outputting a count value of the flags "1", means for storing the count value as weighting data of each area corresponding to each of said plurality of sensor means, and means for operating each detection signal from said plurality of sensor means using the weighting data of each area, and outputting either a mean value or a total value of operation results as the density signal.

10. A controller according to claim 3, wherein said designating means includes means for designating a desired range of the original as an auto-illuminating area, means for generating positional data of the auto-illuminating area, and means for storing the positional data as the designation output.

11. An auto-illuminating controller for an image scanning apparatus, said controller comprising:

original scanning means having an illuminating source, for applying light to an original, thereby scanning the original in a first direction;

designating means for designating a desired portion of the original;

a single photosensor means movably arranged in a second direction, perpendicular to the first direction, so as to receive light reflected from the desired portion on the original which has been designated by said designating means, and to output signal representing the density of the desired portion of the original;

weighting operation means for receiving a designation output from the designating means and providing different weighting data items for an area inside the desired portion and an area outside the desired portion, and for receiving the signal output from said single photosensor means, applying the different weighting data items to the signals, and outputting a density signal representing the density of the desired portion of the original; and control means for receiving the density signal from said weighting operation means and controlling an illumination amount of said illumination source into a value appropriate corresponding to the density of the desired portion of the original.

* * * * *